United States Patent Office 2,847,448
Patented Aug. 12, 1958

2,847,448

PRODUCTION OF ACRYLONITRILE

James F. Gabbett, Jr., Weymouth, and L Hunt Sutherland, Wellesley, Mass., assignors to Escambia Chemical Corporation, Pace, Fla., a corporation of Delaware No Drawing. Application March 8, 1957
Serial No. 644,719

11 Claims. (Cl. 260—465.3)

This invention relates to the production of chemicals and in particular to an improved process for the production of acrylonitrile.

A principal object of the present invention is to provide an improved process for the production of high yields of acrylonitrile readily and cheaply by reacting hydrogen cyanide with acetylene in the vapor phase.

Another object of the invention is to provide an improved process of the above type which permits the use of simple and inexpensive equipment for performing the reaction between hydrogen cyanide and acetylene.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

It is well known that acrylonitrile can be prepared by reacting hydrogen cyanide with acetylene in the vapor phase in the presence of a suitable catalyst. Many catalysts have been reported to be suitable for this reaction and include such materials as activated carbon, silica gel and solid or porous inert or inactive support materials, having either a high surface activity or little or no surface activity, impregnated with alkali metal cyanides, carbonates or hydroxides or mixtures of alkali metal cyanides, etc.

Heretofore, the reaction between hydrogen cyanide and acetylene has been reported to be carried out in reactors whose inner surfaces were formed of, or coated with, such materials as Vycor, ceramic materials, steel and the like. However, the use of such reactor surfaces on an industrial scale is not entirely satisfactory due to their high cost, fragility, frequent need for renewal or catalytic influence which induces undesirable side reactions. It is now well recognized that common reactor materials such as iron or steel induce degradation of acetylene and hydrogen cyanide which seriously affects the yields of acrylonitrile. However, it has now been found that reactors, with reactant-contacting surfaces consisting essentially of copper or an alloy of copper with a second metal selected from the group consisting of zinc, tin, nickel and mixtures thereof, can be utilized to give good yields of acrylonitrile. The use of such reactors makes the present process readily adaptable to commercial operations on an efficient and economical basis.

The process of the present invention preferably comprises catalytically reacting a mixture of hydrogen cyanide and acetylene in the vapor phase in a reactor having a reactant-contacting surface consisting essentially of copper or an alloy of copper with a second metal selected from the group consisting of zinc, tin, nickel and mixtures thereof. In one embodiment of the invention, the catalyst employed is an inert or inactive support, and particularly a porous charcoal support, impregnated or carrying an alkali metal hydroxide, cyanide or carbonate. The inert support, such as porous charcoal, may be impregnated with from about 3 percent to 15 percent by weight of an alkali metal hydroxide, cyanide or carbonate and preferably with about 10 percent by weight of an alkali metal hydroxide, the preferred alkali metal hydroxide being sodium hydroxide.

A more detailed description of producing acrylonitrile in the preferred reactors of the present invention is given in the following examples set forth only to illustrate and not to limit the invention.

Example I 140 grams of deoxygenated charcoal were impregnated with an aqueous solution containing about 14 grams of sodium hydroxide to provide, after drying, about 10 percent by weight of sodium hydroxide in the charcoal. A mixture of acetylene, hydrogen cyanide and diluent gases was passed at a space velocity of about 530 hr.$^{-1}$ (STP) through a brass reactor tube having a composition of about 15 percent zinc and 85 percent copper and containing approximately 154 grams of the thus prepared catalyst (i. e. 140 grams of deoxygenated charcoal plus weight of sodium hydroxide). The reaction tube, during production of acrylonitrile, was maintained in the temperature range of between about 550° C. and 610° C. The mole ratio of acetylene to hydrogen cyanide was about .8, with the amount of acetylene in the acetylene feed stream amounting to approximately 7.4 percent and the pressure being substantially atmospheric. The average conversion of acetylene to acrylonitrile during a run of 10 hours was 73.5 percent, while the average yield of acrylonitrile was 89 percent based on hydrogen cyanide. The brass showed no serious deterioration; the corrosion rate was about 0.006 inch per year.

Example II

In runs similar to that of Example I the following copper-base alloys are found to be suitable.

| Alloy | Composition | Corrosion Rate (inches per year) |
|---|---|---|
| Phosphorized Copper | 99.96 Cu, 0.02 P | 0.014 |
| Phosphor Bronze | 89.99 Cu, 0.12 P; 9.76 Sn, 0.10 Zn; 0.02 Pb, 0.01 Fe | 0.011 |
| Yellow Brass | 66.96 Cu, 32.98 Zn; 0.04 Pb, 0.01 Sn; 0.01 Fe | 0.084 |
| Nickel Silver | 64.19 Cu, 18.27 Zn; 17.09 Ni, 0.41 Mn; 0.04 Fe, 0.02 Pb | 0.009 |

Example III

This reaction was carried out as in Example I (under approximately the same conditions of temperature, pressure, catalysts, etc.) except that the reactor was made of only carbon steel. The average conversion of hydrogen cyanide to acrylonitrile during a run of 10.5 hours was 44.4 percent, while the average yield of acrylonitrile was 56.2 percent based on hydrogen cyanide.

Examples I and III provide a direct comparison between a carbon steel reactor and the preferred copper-base alloy-surfaced reactors. It will be noted that much better conversion to, and yields of, acrylonitrile were obtained in the reactor having a copper-base alloy reactant-contacting surface alloy than in the other illustrated reactor.

The results obtained from copper or copper-base alloy surfaced reactors are quite surprising and novel. The prior art particularly in U. S. Patent 2,419,186 indicates that the presence of an appreciable quantity of copper in contact with the reactants exerts an undesirable catalytic influence as does iron. In the present invention, although copper or copper alloyed with zinc, tin, nickel, or mixtures thereof is present in contact with the reactants, no deleterious catalytic influence is noticed and excellent yields of acrylonitrile are obtained. As previously stated, iron or steel reactors exert an undesirable catalytic influence on the reactants at reaction temperatures. Thus, on conducting the reaction between acetylene and hydrogen cyanide in a steel reactor, the yields and conversion obtained are markedly inferior to the results obtained with copper or copper-base alloy-surfaced reactors. This is clearly illustrated in comparing the results of Example I with Example III. In Example III, when the catalyst in the steel reactor was examined after only about 10 hours of use, substantial deposits of carbonaceous material were found on the walls of the reactor and on the catalyst particles. The catalyst particles proved to be strongly cemented together by this deposit. This undesirable occurrence does not take place in a reactor having a copper or copper-base alloy surface, even after prolonged use. Naturally, it is very advantageous to be able to avoid this deposition of carbonaceous material, since, in addition to causing losses of reacting materials and making difficult the removal of spent catalyst, the deposition also leads to stoppage of the flow of gases through the reactor.

The reactor can be fabricated either as shown in Example I, i. e. a reactor formed entirely of a preferred copper or copper-base alloy or reactor surfaces or liners made of a copper or copper-base alloy backed by steel. The reactors of the instant invention have the important advantage in that they are easily fabricated from commercially available alloys.

Alloys consisting essentially of copper with zinc are known as brass and with tin as bronze. Brass can contain from about 55 percent to about 95 percent copper. For example, yellow brass contains between about 65–70 percent copper, cartridge brass contains about 70 percent copper, low brass contains about 80 percent copper, red brass contains about 85 percent copper, commercial bronze contains about 90 percent copper and gilding metal contains about 95 percent copper. Bronze usually contains more than about 80 percent copper with tin substantially making up the balance. Lead and iron usually constitute the impurities to be found in brass and bronze.

The temperature range for the reaction between acetylene and hydrogen cyanide may vary from about 450° C. to about 700° C. However, it is preferably maintained between about 525° C. and 625° C. The space velocity may vary from about 100 to about $1500^{-1}$ (STP), preferred space velocities being on the order of between about 300 and 800 hr.$^{-1}$ (STP). The molar ratio of acetylene to hydrogen cyanide may be varied quite widely from between about 0.5:1 to about 1.6:1 and higher, preferred molar ratios being on the order of between about 0.8:1 to 1.2:1.

In the above example, specific operating conditions have been given. These conditions, however, are subject to considerable variation without departing from the scope of the invention. For example, the pressure range in the reactor may vary from about atmospheric pressure to about 100 pounds per square inch. Inert or inactive catalyst supports, other than oxygen-free, porous charcoal, can be employed. Likewise, such supports can carry or be impregnated with an alkali metal carbonate or cyanide, in addition to the alkali metal hydroxide illustrated.

Since certain changes may be made in the above process without departing from the scope of the invention herein involved, it is intended that all matter contained in the above description be interpreted as illustrative and not in a limiting sense.

What is claimed is:

1. In the process for the production of acrylonitrile by reacting a mixture of acetylene and hydrogen cyanide in the vapor phase in the presence of an inert catalyst support carrying a compound selected from the group consisting of the alkali metal hydroxides, cyanides and carbonates, the improvement which comprises reacting said mixture in a reactor having a reactant-contacting surface selected from the group consisting of copper and alloys of copper with at least one metal of the group consisting of zinc, tin, nickel and mixtures thereof.

2. In the process for the production of acrylonitrile by reacting a mixture of acetylene and hydrogen cyanide in the vapor phase in the presence of an inert catalyst support carrying a compound selected from the group consisting of the alkali metal hydroxides, cyanides and carbonates, the improvement which comprises reacting said mixture in a reactor having a reactant-contacting surface consisting of brass.

3. In the process for the production of acrylonitrile by reacting a mixture of acetylene and hydrogen cyanide in the vapor phase in the presence of an inert catalyst support carrying a compound selected from the group consisting of the alkali metal hydroxides, cyanides and carbonates, the improvement which comprises reacting said mixture in a reactor having a reactant-contacting surface consisting of bronze.

4. In the process for the production of acrylonitrile by reacting a mixture of acetylene and hydrogen cyanide in the vapor phase in the presence of an inert catalyst support carrying a compound selected from the group consisting of the alkali metal hydroxides, cyanides and carbonates, the improvement which comprises reacting said mixture in a reactor, having a reactant-contacting surface consisting essentially of copper.

5. In the process for the production of acrylonitrile by reacting a mixture of acetylene and hydrogen cyanide in the vapor phase in the presence of an inert catalyst support carrying a compound selected from the group consisting of the alkali metal hydroxides, cyanides and carbonates, the improvement which comprises reacting said mixture in a reactor having a reactant-contacting surface consisting of an alloy of copper and zinc.

6. In the process of claim 5 wherein said alloy of copper and zinc consists essentially of about 67 percent copper and about 33 percent zinc.

7. In the process of claim 5 wherein said alloy of copper and zinc consists essentially of about 85 percent copper and about 15 percent zinc.

8. In the process for the production of acrylonitrile by reacting a mixture of acetylene and hydrogen cyanide in the vapor phase in the presence of an inert catalyst support carrying a compound selected from the group consisting of the alkali metal hydroxides, cyanides and carbonates, the improvement which comprises reacting said mixture in a reactor having a reactant-contacting surface consisting of an alloy of copper and tin.

9. In the process of claim 8 wherein said alloy of copper and tin consists essentially of about 9.75 percent tin and the balance being substantially copper.

10. In the process for the production of acrylonitrile by reacting a mixture of acetylene and hydrogen cyanide in the vapor phase in the presence of an inert catalyst support carrying a compound selected from the group consisting of the alkali metal hydroxides, cyanides and carbonates, the improvement which comprises reacting said mixture in a reactor having a reactant-contacting surface consisting of an alloy of copper, nickel and zinc.

11. In the process of claim 10 wherein said alloy of copper, nickel and zinc consists essentially of about 17 percent nickel, 18.25 percent zinc and the balance being substantially copper.

References Cited in the file of this patent

UNITED STATES PATENTS

| | | |
|---|---|---|
| 2,419,186 | Harris et al. | Apr. 15, 1947 |
| 2,429,460 | Harris et al. | Oct. 21, 1947 |
| 2,762,834 | Gabbett et al. | Sept. 11, 1956 |